US012797828B1

(12) United States Patent
Ahmed

(10) Patent No.: US 12,797,828 B1
(45) Date of Patent: Nov. 17, 2026

(54) PARTICULATE NANOCOMPOSITE MATERIAL

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/212,350

(22) Filed: May 19, 2025

(51) Int. Cl.
*B01J 23/14* (2006.01)
*B01J 23/72* (2006.01)
(Continued)

(52) U.S. Cl.
CPC ............... *B01J 23/14* (2013.01); *B01J 23/72* (2013.01); *B01J 23/78* (2013.01); *B01J 35/39* (2024.01);
(Continued)

(58) Field of Classification Search
CPC ... B01J 23/14; B01J 23/72; B01J 23/78; B01J 35/39; B01J 35/40; B01J 35/51;
(Continued)

(56) References Cited

U.S. PATENT DOCUMENTS 3,330,697 A * 7/1967 Pechini .................... H01G 4/12 423/594.12
5,266,210 A * 11/1993 Mclaughlin ............... C02F 9/00 210/725

(Continued)

FOREIGN PATENT DOCUMENTS

CN 103641158 A * 3/2014
CN 104628498 A * 5/2015

(Continued)

OTHER PUBLICATIONS

Kitaguchi et al., "Equilibrium phase diagram for the system PbO—CaO—CuO" (Year: 1990).*

(Continued)

*Primary Examiner* — Bobby Ramdhanie
*Assistant Examiner* — William Addison Geisbert
(74) *Attorney, Agent, or Firm* — Oblon, McClelland, Maier & Neustadt, L.L.P.

(57) ABSTRACT

A particulate nanocomposite material comprising, as determined by X-ray diffraction (XRD): an orthorhombic lead (II) oxide (PbO) crystalline phase; and, an orthorhombic $Ca_2PbO_4$ crystalline phase. The particulate nanocomposite material further comprises either a monoclinic copper (II) oxide (CuO) crystalline phase or both of a tetragonal PbO crystalline phase and an orthorhombic $Ca_2CuO_3$ crystalline phase. Based on the total number of atoms in the nanocomposite material, the nanocomposite material has: an atomic concentration of lead (Pb) of from about 10 to about 25 atom %; an atomic concentration of calcium (Ca) of from about 10 to about 25 atom %; and, an atomic concentration of copper (Cu) is from about 10 to about 25 atom %.

2 Claims, 6 Drawing Sheets

(51) Int. Cl.

| | |
|---|---|
| ***B01J 23/78*** | (2006.01) |
| ***B01J 35/30*** | (2024.01) |
| ***B01J 35/39*** | (2024.01) |
| ***B01J 35/40*** | (2024.01) |
| ***B01J 35/51*** | (2024.01) |
| ***B01J 35/54*** | (2024.01) |
| ***B01J 37/02*** | (2006.01) |
| ***B01J 37/03*** | (2006.01) |
| ***B01J 37/04*** | (2006.01) |
| ***B01J 37/08*** | (2006.01) |
| ***C02F 1/32*** | (2023.01) |
| ***C02F 1/72*** | (2023.01) |
| *C02F 101/10* | (2006.01) |
| *C02F 101/30* | (2006.01) |

(52) U.S. Cl.

CPC ........... *B01J 35/393* (2024.01); *B01J 35/394* (2024.01); *B01J 35/40* (2024.01); *B01J 35/51* (2024.01); *B01J 35/54* (2024.01); *B01J 37/0236* (2013.01); *B01J 37/036* (2013.01); *B01J 37/04* (2013.01); *B01J 37/088* (2013.01); *C02F 1/32* (2013.01); *C02F 1/725* (2013.01); *C02F 2101/10* (2013.01); *C02F 2101/30* (2013.01); *C02F 2305/10* (2013.01)

(58) Field of Classification Search

CPC ........ B01J 35/54; B01J 35/393; B01J 35/394; B01J 37/036; B01J 37/236; B01J 37/04; B01J 37/088; B01J 37/0236; C02F 2101/10; C02F 2101/30; C02F 1/32; C02F 1/725; C02F 2305/10

USPC .......................................................... 210/748

See application file for complete search history.

(56) References Cited

U.S. PATENT DOCUMENTS

| | | | | |
|---|---|---|---|---|
| 6,482,387 | B1 * | 11/2002 | Gulgun ................. | C01B 13/185 423/253 |
| 9,834,854 | B2 * | 12/2017 | Ozoemena ................ | C30B 1/04 |

FOREIGN PATENT DOCUMENTS

| | | | | |
|---|---|---|---|---|
| EP | 0431170 A1 * | 6/1991 | | ............. C01G 3/006 |
| EP | 0 536 730 A1 | 4/1993 | | |
| JP | 3-97622 A | 4/1991 | | |
| WO | WO-2014049165 A1 * | 4/2014 | | ............. B01J 35/45 |

OTHER PUBLICATIONS

Joshua W. Pinder et al., “Avoiding common errors in X-ray photoelectron spectroscopy data collection and analysis, and properly reporting instrument parameters” Applied Surface Science Advances 19 (2024) 100534 (Year: 2024).*

Monika Kwoka and Maciej Krzywiecki, Beilstein J. Nanotechnol. 2017, 8, 514-521 (Year: 2017).*

Gregory P. Lopinski et al., Nanoscale Adv., 2025, 7, 1671 (Year: 2025).*

Kawsar et al., “Hydrothermal synthesis of nano-metal oxides for structural modification: A review” Next Nanotechnology 7 (2025) 100167 (Year: 2025).*

Borhade et al., “An Efficient Photocatalytic Degradation of Methyl Blue Dye by Using Synthesised PbO Nanoparticles”, E-Journal of Chemistry, 2012, 9(2), 705-715 (Year: 2012).*

J.Q. Li, et al., “Investigation of the BaO—CaO—CuO Ternary System at 850 ”, International Journal of Materials Research, vol. 88, No. 9, 1997, pp. 698-700.

* cited by examiner

PARTICULATE NANOCOMPOSITE MATERIAL

BACKGROUND

Technical Field

The present disclosure is directed to a particulate nanocomposite material comprising an orthorhombic PbO crystalline phase and an orthorhombic $Ca_2PbO_4$ crystalline phase, and more particularly is directed to a method of synthesizing said lead-calcium-copper based particulate nanocomposite material.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Conventional research on nanocomposite materials has focused on simple or binary systems which often lack versatility, phase purity and structural adaptability. Existing studies fail to address the synthesis of complex and multifunctional nanocomposites with tailored properties. In the prior art, the conventional methods of synthesizing nanocomposite materials also often fail to eliminate carbon residues derived from organic precursors and fail to effectively incorporate oxygen into the material, as a result of which the nanocomposite material may become thermally unstable. Moreover, conventional synthesis methods often produce materials with limited structural and compositional diversity. There is a consequently a need in the art to develop nanocomposites by a scalable, energy-efficient, and cost-effective synthesis process, the development of which can thereby fill a critical gap in the field of advanced materials.

Accordingly, one object of the present disclosure is to provide a method of producing a particulate nanocomposite material that may circumvent the above listed drawbacks and limitations of the methods known in the art.

SUMMARY

A particulate nanocomposite material comprising, as determined by X-ray diffraction:: an orthorhombic lead (II) oxide (PbO) crystalline phase; and, an orthorhombic dicalcium lead (IV) oxide ($Ca_2PbO_4$) crystalline phase. The particulate nanocomposite material further comprises either a monoclinic copper (II) oxide (CuO) crystalline phase or both of a tetragonal PbO crystalline phase and an orthorhombic $Ca_2CuO_3$ crystalline phase. Based on the total number of atoms in the nanocomposite material, the nanocomposite material has: an atomic concentration of lead (Pb) of from about 10 to about 25 atom %; an atomic concentration of calcium (Ca) of from about 10 to about 25 atom %; and, an atomic concentration of copper (Cu) is from about 10 to about 25 atom %.

In some embodiments, the particulate nanocomposite material comprises, as determined by XRD: an orthorhombic PbO crystalline phase; an orthorhombic $Ca_2PbO_4$ crystalline phase; and, a monoclinic CuO crystalline phase. The X-ray spectroscopic analysis of the particulate nanocomposite indicates carbon is also present. Based on the total number of atoms in the nanocomposite material, the nanocomposite material has: an atomic concentration of carbon (C) of from about 5 to about 15 atom %; an atomic concentration of Pb of from about 10 to about 20 atom %; an atomic concentration of Ca of from about 15 to about 25 atom %; and, an atomic concentration of copper Cu of from about 10 to about 20 atom %.

In some embodiments, the particulate nanocomposite material comprises substantially spherical particles and agglomerates thereof. At least a fraction of the spherical particles has a particle size of less than 400 nanometers (nm), as determined by scanning electron microscopy (SEM).

In some embodiments, the particulate nanocomposite material has a volume average crystallite size from about 68 to about 72 nm, as determined by X-ray diffraction.

In some embodiments, the particulate nanocomposite material comprises, as determined by X-ray diffraction: an orthorhombic PbO crystalline phase; an orthorhombic $Ca_2PbO_4$ crystalline phase; a tetragonal PbO crystalline phase; and, an orthorhombic $Ca_2CuO_3$ crystalline phase. Based on the total number of atoms in the nanocomposite material, the nanocomposite material has: an atomic concentration of C of from about 0 to about 5 atom %; an atomic concentration of Pb of from about 15 to about 25 atom %; an atomic concentration of Ca of from about 15 to about 25 atom %; and, an atomic concentration of Cu is from about 15 to about 25 atom %.

In some embodiments, the particulate nanocomposite material includes substantially plate-like particles and agglomerates. At least a fraction of the plate-like particles has a particle size of greater than 1000 nm as determined by SEM.

In some embodiments, the particulate nanocomposite material has a volume average crystallite size from about 58 to about 62 nm, as determined by X-ray diffraction.

In another exemplary embodiment, a method for preparing the particulate nanocomposite material is described. The method comprises: forming an aqueous mixture by adding an aqueous solution of a chelating agent to an aqueous solution of a calcium salt, a copper salt and a lead salt; adding a polyol into the aqueous mixture to form a gel; heating the gel under stirring at a temperature of from about 200 to about 400° C. for a sufficient duration to form a dry powder; and, calcining the dry powder at a temperature of from about 600 to about 900° C. to form the particulate nanocomposite material.

In some embodiments, the aqueous solution of the chelating agent is added in a dropwise manner into the aqueous solution of the calcium salt, the copper salt, and the lead salt.

In some embodiments, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In some embodiments, the copper salt is selected from the group consisting of copper (II) sulfate (CuSO4), copper (II) nitrate ($Cu(NO_3)_2$, copper (II) chloride ($CuCl_2$) and copper (II) acetate ($Cu(CH_3COO)_2$). In some embodiments, the Pb salt is selected from the group consisting of lead sulfate ($PbSO_4$), lead nitrate ($Pb(NO_3)_2$), lead chloride ($PbCl_2$) and lead acetate ($Pb(CH_3COO)_2$).

In some embodiments, the calcium salt is calcium nitrate ($Ca(NO_3)_2$), the copper salt is copper (II) nitrate ($Cu(NO_3)_2$, and the lead salt is lead nitrate ($Pb(NO_3)_2$).

In some embodiments, the chelating agent comprises at least one hydroxyalkyl carboxylic acid selected from the group consisting of citric acid, tartaric acid, malic acid, mandelic acid and 12-hydroxystearic acid.

In some embodiments, the chelating agent comprises or consists of tartaric acid.

In some embodiments, the polyol is added in a dropwise manner into the aqueous mixture In some embodiments, the polyol has a number average molecular weight (Mn) of from about 200 to about 5000 grams per mole (g/mol) and hydroxyl number of from about 25 to about 500 milligrams (mg) potassium hydroxide per gram (KOH/g).

In some embodiments, the polyol is selected from the group consisting of polyester polyols, polyether polyols, poly(ether-ester) polyols, poly(alkylene carbonate) polyols, and mixtures thereof.

In some embodiments, the polyol comprises a polyoxy ($C_2$-$C_3$)alkylene polyol.

In some embodiments, the polyol comprises a polyoxy ($C_2$-$C_3$)alkylene polyol has a number average molecular weight (Mn) of from about 200 to about 5000 g/mol, and an hydroxyl number of from about 25 to about 500 mg KOH/g.

In some embodiments, there is provided a method of immobilizing inorganic contaminants disposed in an aqueous medium, the method comprising contacting the aqueous medium with the particulate nanocomposite material as defined hereinabove and in the appended claims In some embodiments, there is provided a method of degrading organic pollutants disposed in an aqueous medium, the method comprising contacting the aqueous medium with the particulate nanocomposite material as defined hereinabove and in the appended claims while irradiating the aqueous medium with actinic irradiation.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
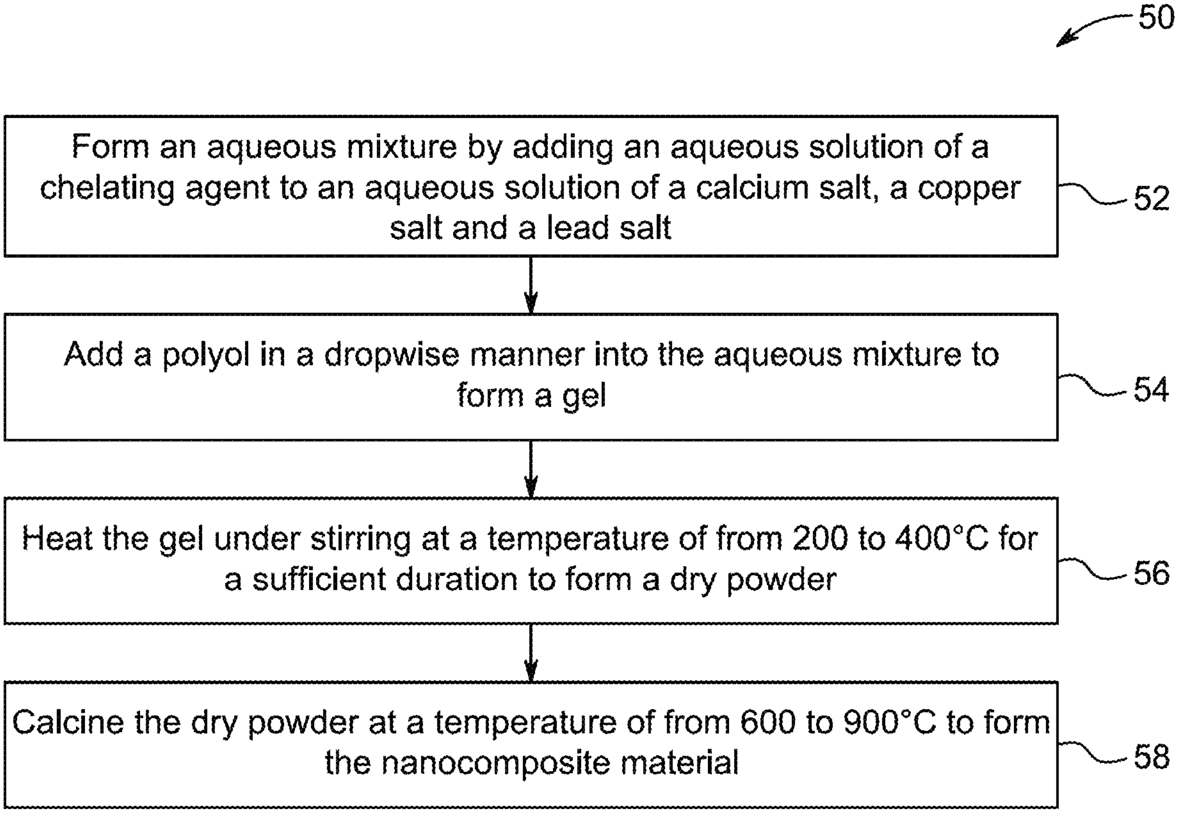
FIG. 1A is a flowchart of a method of preparing a particulate nanocomposite material, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)±2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'fraction' refers to a numerical quantity which defines a part up to, but not including, 100 percent or the entirety of the thing in question.

As used herein the term 'disposed' refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term 'high-resolution transmission electron microscopy (HRTEM)' refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

An orthorhombic crystalline phase refers to a crystal structure having three mutually perpendicular axes of unequal lengths ($a \neq b \neq c$). This means the crystal lattice forms a rectangular prism where the edges represent the three axes, all intersecting at 90-degree angles ($\alpha = \beta = \gamma =$) 90°.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term 'particle' refers to a small object that acts as a whole unit with regard to its transport and properties. As used herein, 'nanoparticles'-sometimes contracted herein to NPs-refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term 'porosity' refers to a measure of the void or vacant spaces within a material. As used herein, the term 'pore volume' refers to the total volume of void spaces (pores) within a material that is capable of being filled by a gas or liquid: it is typically expressed in cubic centimeters per gram ($cm^3/g$).

As used herein, the Brunauer-Emmett-Teller (BET) analysis references the method of measuring the specific surface area (m2/g) of a solid material via the adsorption of gas molecules onto the surface of the solid, as detailed in Standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134:1998-02.

As used herein, the term 'porous particulate nanocomposite' refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant (8) of more than 5 as measured at 25° C. The determination of dielectric constant (8) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'-alternatively referenced as polyalkylene oxide-refers herein to an aliphatic polyether which is built from repeated-O-A-units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'organic pollutant' refers to a type of pollutant that contains carbon-based compounds, generally originating from human activities. These pollutants may come from sources such as pesticides, industrial chemicals, plastics, and solvents. They tend to be harmful to the environment and living organisms, as they can be toxic, persistent, and bioaccumulate in ecosystems. Examples include substances such as benzene, dichlorodiphenyltrichloroethane (DDT), and polychlorinated biphenyls (PCBs). Herein, the organic pollutant may be a dye, a phenol, a polycyclic aromatic hydrocarbon, an herbicide, a pesticide, a persistent organic pollutant, and so on.

As used herein, the term 'inorganic contaminants' refer to harmful substances that originate from non-living sources and do not contain carbon-hydrogen bonds. These contaminants typically come from minerals, metals, and salts found in the environment, and they can be harmful to both humans and ecosystems when present in high concentrations. Common examples include heavy metals such as lead, mercury, and arsenic, as well as other inorganic compounds such as nitrates, phosphates, and fluorides.

Aspects of the present disclosure are directed toward a lead-calcium-copper-based particulate nanocomposite materials which comprise: either orthorhombic PbO/orthorhombic $Ca_2PbO_4$/monoclinic CuO/C crystalline phases; or, orthorhombic $Ca_2CuO_3$/orthorhombic PbO/orthorhombic $Ca_2PbO_4$/tetragonal PbO crystalline phases. The described nanocomposite materials are fabricated using a Pechini sol-gel method. The method allows precise control over phase formation, composition, and morphology through inter alia a selection of calcination conditions. The present disclosure results in nanocomposites with distinct structural and compositional features, showing a transformation in morphology from agglomerated spherical particles to larger, plate-like structures with increased calcination temperature. This scalable and environmentally friendly synthesis process offers advanced applications in nanotechnology.

A particulate nanocomposite material is described. The particulate nanocomposite material comprises, as determined by X-ray diffraction (XRD): an orthorhombic PbO crystalline phase and an orthorhombic $Ca_2PbO_4$ crystalline phase. The particulate nanocomposite material further includes either: a monoclinic CuO crystalline phase; or both of a tetragonal PbO crystalline phase and an orthorhombic $Ca_2CuO_3$ crystalline phase. Based on the total number of atoms in the particulate nanocomposite material, the nanocomposite material has: an atomic concentration of lead (Pb) of from about 10 to about 25 atom %; an atomic concentration of calcium (Ca) of from about 10 to about 25 atom %; and, an atomic concentration of copper (Cu) of from about 10 to about 25 atom %.

In a first embodiment, the particulate nanocomposite material (orthorhombic PbO/orthorhombic $Ca_2PbO_4$/monoclinic CuO/C nanocomposite) comprises, as determined by XRD: an orthorhombic PbO crystalline phase; an orthorhombic $Ca_2PbO_4$ crystalline phase; and, a monoclinic CuO crystalline phase. Further, as determined by X-ray spectroscopic (XPS) analysis, the particulate nanocomposite includes carbon. Still further, based on the total number of atoms in the nanocomposite material: the atomic concentration of carbon (C) is from about 5 to about 15 atom %, for example from about 10 to about 20 atom %, about 6 to about 14 atom %, about 7 to about 13 atom %, about 8 to about 12 atom %, or about 11.5 atom %; the atomic concentration of lead (Pb) is from about 10 to about 20 atom %, for example from about 11 to about 19 atom %, from about 12 to about 18 atom %, from about 13 to about 17 atom %, from about 14 to about 17 atom %, or about 16.6 atom %; the atomic concentration of calcium (Ca) is from about 15 to about 25 atom %, for example from about 16 to about 24 atom %, from about 17 to about 23 atom %, or about 22.9 atom %; and, the atomic concentration of copper (Cu) is from about 10 to about 20 atom %, for example from about 11 to about 19 atom %, from about 12 to about 18 atom %, from about 13 to about 17 atom %, from about 14 to about 17 atom %, or about 15.2 atom %

In this first embodiment, the particulate nanocomposite material may include substantially spherical particles, and agglomerates thereof. At least a fraction—for instance at least 50% or at least 60%—of the spherical particles has a particle size of less than 400 nm, as determined by scanning electron microscope (SEM). The particulate nanocomposite material of this first embodiments may have a volume average crystallite size, as determined by XRD, of from about 68 to about 72 nm, for example from about 69 to about 71 nm, or about 70.26 nm. In a second embodiment, the particulate nanocomposite material (orthorhombic $Ca_2CuO_3$/orthorhombic PbO/orthorhombic $Ca_2PbO_4$/tetragonal PbO nanocomposite) comprises, as determined by X-ray diffraction: an orthorhombic PbO crystalline phase; an orthorhombic $Ca_2PbO_4$ crystalline phase; a tetragonal PbO crystalline phase; and, an orthorhombic $Ca_2CuO_3$ crystalline phase. Further, based on the total number of atoms in the nanocomposite material: the atomic concentration of carbon (C) is from about 0 to about 5 atom %, for example about 0 atom %; the atomic concentration of lead (Pb) is from about 15 to about 25 atom %, for example from about 16 to about 24 atom %, from about 17 to about 23 atom %, or about 19.4 atom %; the atomic concentration of calcium (Ca) is from about 15 to about 25 atom %, for example from about 16 to about 24 atom %, from about 17 to about 23 atom %, or about 20 atom %; and, the atomic concentration of copper (Cu) is from about 15 to about 25 atom %, for example from about 16 to about 24 atom %, from about 17 to about 23 atom %, or about 20.7 atom %.

In this second embodiment, the particulate nanocomposite material may comprise substantially plate-like particles and agglomerates thereof. At least a fraction—for instance at least 30%, at least 40% or at least 50%—of the plate-like particles has a particle size of greater than about 1000 nm, as determined by Scanning Electron Microscopy (SEM). The particulate nanocomposite material has a volume average crystallite size, as determined by XRD, of from about 58 to about 62 nm, for example from about 59 to about 61 nm, or about 60.54 nm.

FIG. 1A illustrates a schematic flow chart of a method 50 of preparing the particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming an aqueous mixture by adding an aqueous solution of a chelating agent to an aqueous solution of a calcium salt, a copper salt and a lead salt. The aqueous solution of the chelating agent is preferably added in a dropwise manner into the aqueous solution of the calcium salt, the copper salt and the lead salt.

In some embodiments, the calcium salt may include, but is not limited to, calcium chloride, calcium sulfate, calcium carbonate, calcium hydroxide, calcium oxide, calcium acetate, calcium citrate, calcium lactate, calcium gluconate, calcium phosphate, calcium ascorbate, calcium benzoate, calcium malate, calcium fumarate, calcium oxalate, calcium stearate, calcium tartrate, calcium salicylate, calcium formate, calcium propionate, calcium valerate, calcium succinate, calcium iodide, calcium bromide, calcium fluoride, calcium thiocyanate, calcium perchlorate, calcium chromate, calcium molybdate, and calcium tungstate. In an embodiment, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In a preferred embodiment, calcium salt is calcium nitrate $Ca(NO_3)_2 \cdot 4H_2O$.

In some embodiments, the copper salt may include, but is not limited to, copper (I) chloride, copper (I) oxide, copper (II) carbonate, copper (II) phosphate, copper (II) bromide, copper (II) iodide, copper (II) sulfate pentahydrate, copper (II) oxalate, copper (II) thiocyanate, copper (I) chloride, copper (I) oxide, copper (II) carbonate, copper (II) phosphate, copper (II) bromide, copper (II) iodide, copper (II) sulfate pentahydrate, copper (II) oxalate, and copper (II) thiocyanate. In an embodiment, the copper salt is selected from the group consisting of copper (II) sulfate (CuSO4), copper (II) nitrate ($Cu(NO_3)_2$, copper (II) chloride ($CuCl_2$) and copper (II) acetate ($Cu(CH_3COO)_2$). In a preferred embodiment, the copper salt is copper (II) nitrate ($Cu(NO_3)_2$.

In some embodiments, the lead salt may include, but is not limited to, lead carbonate, lead bromide, lead iodide, lead chromate, lead fluoride, lead hydroxide, lead sulfide, lead oxalate, lead phosphate, lead stearate, lead thiocyanate, lead tetrafluoroborate, lead methanesulfonate, lead azide, lead formate, lead cyanide, lead lactate, lead butanoate, lead oleate, lead chlorate, lead perchlorate, lead styphnate, and lead tungstate. In an embodiment, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$). In a preferred embodiment, the lead salt is lead nitrate ($Pb(NO_3)_2$).

In some embodiments, the chelating agent includes at least one hydroxyalkyl carboxylic acid selected from the group consisting of citric acid, tartaric acid, malic acid, mandelic acid, and 12-hydroxystearic acid. In certain embodiments, salts or esters of said hydroxyalkyl carboxylic acids may be utilized.

Further exemplary chelating agents which may be present in addition to the aforementioned hydroxyalkyl carboxylic acids include, but are not limited to: isosteric acid; isocitric acid; aconitic acid; carboxylic acids, which may be saturated or unsaturated; dicarboxylic acids, which may be saturated or unsaturated and of which examples include adipic acid, fumaric acid, glutaconic acid, muconic acid, citraconic acid and succinic acid; tricarboxylic acids; aminopolycarboxylic acids, polycarboxylic acids; salts of said acids; or, esters of said acids. In some embodiments, the chelating agent may include one or more of disodium edetate, trisodium edetate, lactic acid, sodium polyphosphate, sodium metaphosphate or gluconic acid, and salicylic acid.

In some alternate embodiments, the chelating agent comprises or consists of tartaric acid. Tartaric acid includes natural and commercial forms of the acid. In some embodiments, tartaric acid is D-tartaric acid, L-tartaric acid, achiral tartaric acid or racemic mixture of D- and L-tartaric acid forms.

At step 54, the method 50 includes adding a polyol into the aqueous mixture to form a gel. The polyol is added in a dropwise manner into the aqueous mixture. In some embodiments, the polyol has a number average molecular weight of from about 200 to about 5000 g/mol, and an hydroxyl number of from about 25 to about 500 mg KOH/g.

Typically herein, the polyol has: a number average molecular weight of from about 200 to about 5000 g/mol., preferably from about 200 to about 1000 g/mol, and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl) propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly(ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl-valerolactone, ϵ-caprolactone and ($C_1$-$C_6$)alkyl-ϵ-caprolactone.

In an embodiment, the polyol is a polyether polyol. Exemplary polyether polyols may be obtained from the polymerization of a cyclic oxide-such as ethylene oxide, propylene oxide or butylene oxide- or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy ($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy ($C_2$-$C_3$)alkylene polyol having: a number average molecular weight of from about 200 to about 1000 g/mol, or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy ($C_2$-$C_3$)alkylene polyol.

At step 56, the method 50 includes heating the gel under stirring at a temperature of from about 200 to about 400° C. for a sufficient duration to form a dry powder. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. In some embodiments, the method includes heating gel under stirring at a temperature of from 150 to about 300° C., for example from about 155 to about 290° C., from about 160 to about 285° C., from about 165 to about 280° C., from about 170 to about 275° C., from about 175 to about 270° C., from about 180 to about 265° C., from about 185 to about 260° C. or from about 190 to about 255° C. In a preferred embodiment, the gel is heated at about 250° C. under continuous stirring.

At step 58, the method 50 includes calcining the dry powder at a temperature of from about 600 to about 900° C. for a duration of from about 2 to about 5 hours, for example from about 2.5 to about 3.5 hours, or about 3 hours to form the nanocomposite material. In a first embodiment, the dry powder is calcined at a temperature of from about 600 to about 700° C., for example from about 620 to about 680° C., from about 630 to about 670° C., or about 650° C. to form the afore-described orthorhombic PbO/orthorhombic $Ca_2PbO_4$/monoclinic CuO/C nanocomposite. In a second embodiments, the dry powder is calcined at a temperature of from about 750 to about 900° C., for example from about 800 to about 900° C., from about 820 to about 880° C., from about 830 to about 870° C. or about 850° C. to form the afore-described orthorhombic $Ca_2CuO_3$/orthorhombic PbO/orthorhombic $Ca_2PbO_4$/tetragonal PbO nanocomposite.

The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to about 50° C./min, for example up to about 40° C./min, up to about 30° C./min, up to about 20° C./min, up to about 10° C./min, or up to about 5° C./min.

It is not precluded in the present method, that the particles directly obtained from the calcination step may be subjected to at least one of comminution, homogenization or classification in order to moderate the particle size distribution thereof.

In some embodiments, a method of immobilizing inorganic contaminants disposed in an aqueous medium is described. The method includes contacting the aqueous medium with the particulate nanocomposite material as described hereinabove, where the particulate nanocomposite material effectively adsorbs or binds the contaminants.

A method of degrading organic pollutants disposed in an aqueous medium is still further described. The method includes contacting the aqueous medium under actinic irradiation with the particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the porous particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the porous particulate nanocomposite material. In this embodiment, the porous particulate nanocomposite material may need to constrained within a bed or membrane which the aqueous medium contacts as either a perpendicular or tangential (cross-) flow stream.

The following examples are provided solely for illustration and are not to be construed as limitations of the present disclosure, as many variations thereof are possible without departing from the spirit and scope of the present disclosure.

EXAMPLES

The following examples demonstrate a particulate nanocomposite material. The examples are provided solely for illustration and are not to be construed as limitations of the present disclosure, as many variations thereof are possible without departing from the spirit and scope of the present disclosure.

Example 1: Experimental

Synthesis of Nanocomposites Using the Pechini Sol-Gel Method

Figure 1B:
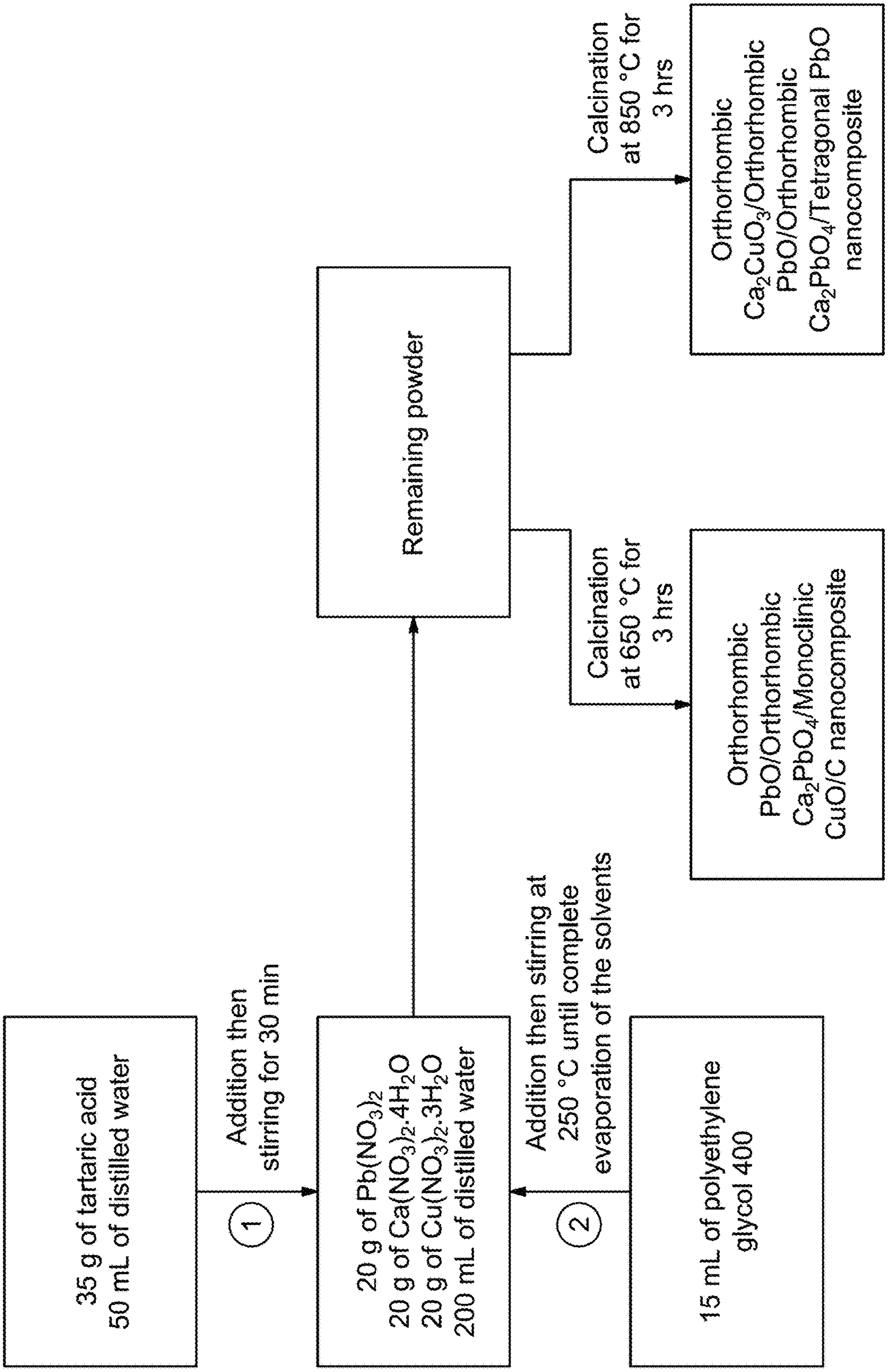
FIG. 1B is an exemplary flowchart of experimental steps for the production of an orthorhombic lead (II) oxide (PbO)/orthorhombic dicalcium lead (IV) oxide ($Ca_2PbO_4$)/monoclinic copper (II) oxide (CuO)/carbon (C) nanocomposite and an orthorhombic $Ca_2CuO_3$/orthorhombic PbO/orthorhombic $Ca_2PbO_4$/tetragonal PbO nanocomposite, according to certain embodiments.

To synthesize the nanocomposites, 35 grams (g) of tartaric acid was dissolved in 50 milliliters (mL) of distilled water, forming Solution 1. Separately, 20 g of lead (II) nitrate ($Pb(NO_3)_2$), 20 g of calcium (II) nitrate tetrahydrate ($Ca(NO_3)_2 \cdot 4H_2O$), and 20 g of copper (II) nitrate trihydrate ($Cu(NO_3)_2 \cdot 3H_2O$) were dissolved in 200 mL of distilled water to prepare Solution 2. Solution 1 was then added to Solution 2 under continuous stirring for 30 minutes. Subsequently, 15 mL of polyethylene glycol 400 was added to the mixture with continuous stirring at 250° C. until complete evaporation of solvents occurred. A first fraction of the resulting powder was calcined at 650° C. for 3 hours to produce the orthorhombic PbO/Orthorhombic dicalcium lead (IV) oxide ($Ca_2PbO_4$)/monoclinic CuO/C nanocomposite. A second fraction of the resulting powder was calcined at 850° C. for 3 hours to obtain the orthorhombic $Ca_2CuO_3$/orthorhombic PbO/rthorhombic $Ca_2PbO_4$/tetragonal PbO nanocomposite. FIG. 1B illustrates the experimental steps followed to produce the above nanocomposites.

Figure 2A:
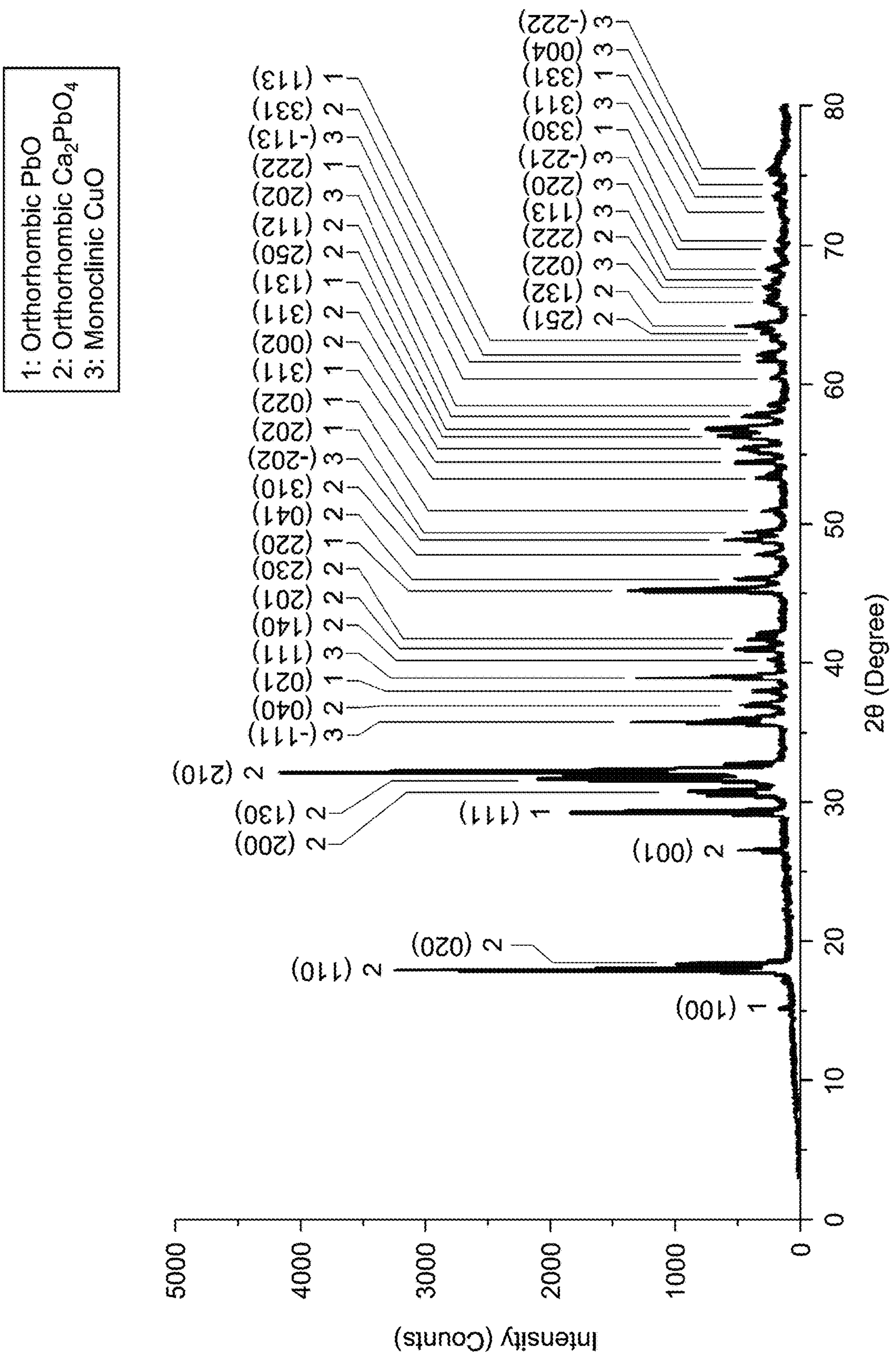
FIG. 2A shows an X-ray diffraction (XRD) pattern of a nanocomposite synthesized at 650° C. using the Pechini sol-gel method, according to certain embodiments.
Figure 2B:
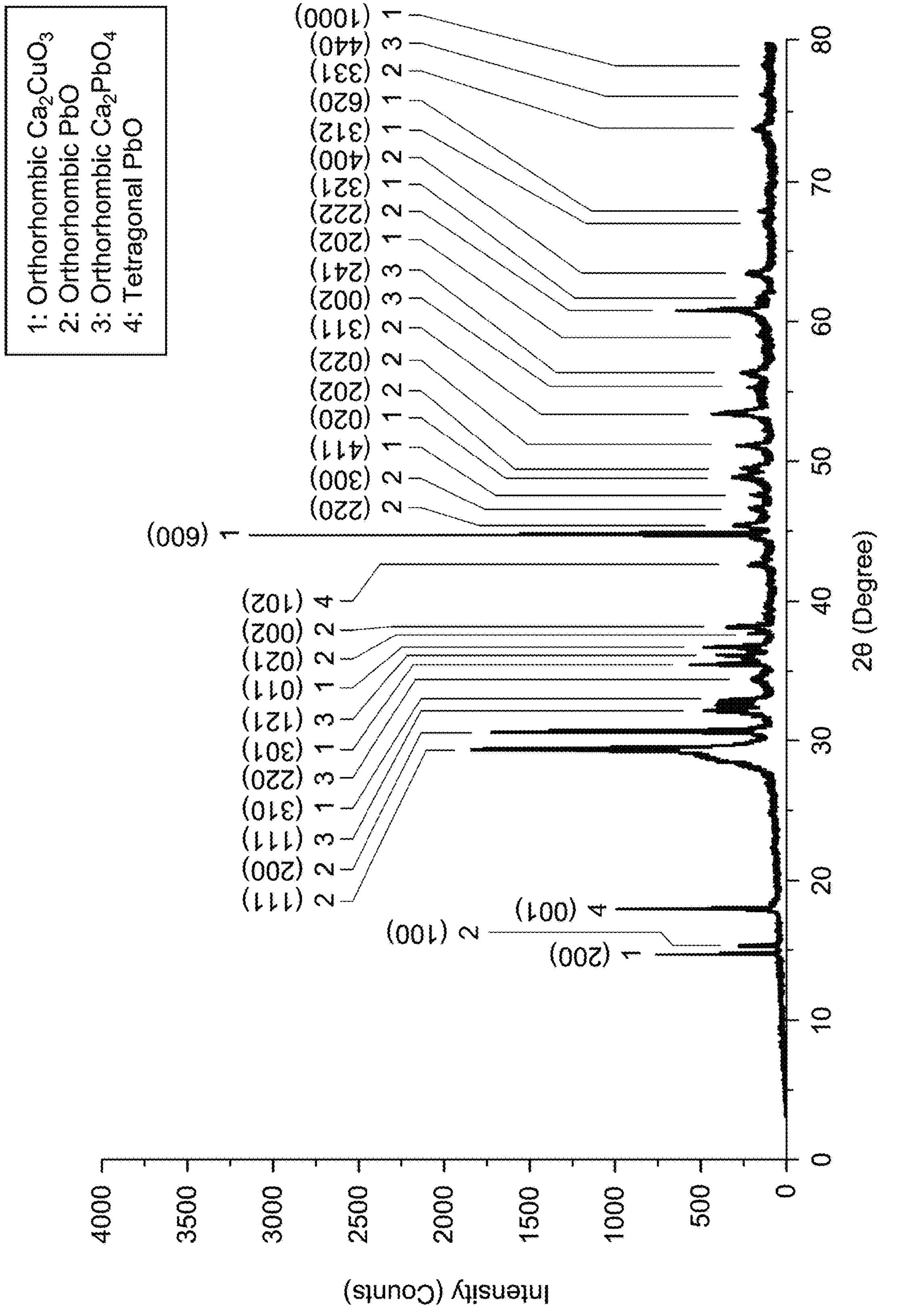
FIG. 2B shows a XRD pattern of a nanocomposite synthesized at 850° C. using the Pechini sol-gel method, according to certain embodiments.

FIGS. 2A-2B illustrates the X-ray diffraction (XRD) patterns of the nanocomposites synthesized at 650° C. (FIG. 2A) and 850° C. (FIG. 2B) using the Pechini sol-gel method. The average crystallite size of the samples was 70.26 nanometers (nm) for the nanocomposite synthesized at 650° C. and 60.54 nm for the composite synthesized at 850° C.

For the nanocomposite synthesized at 650° C.: the orthorhombic PbO phase (JCPDS Card No. 01-072-0093, the disclosure of which is incorporated herein by reference in its entirety) was identified at 2θ angles of 15.10°, 29.17°, 37.88°, 45.11°, 49.32°, 50.89°, 53.19°, 56.23°, 60.43°, 63.16°, 70.29°, and 73.34°, corresponding to the Miller indices (100), (111), (021), (220), (202), (022), (311), (131), (222), (113), (330), and (331), respectively; the orthorhombic CazPbO$_4$ phase (JCPDS Card No. 00-024-0207, the disclosure of which is incorporated herein by reference in its entirety) appeared at 2θ angles of 17.84°, 18.26°, 26.43°, 30.64°, 31.57°, 31.99°, 36.94°, 40.18°, 40.82°, 41.66°, 45.85°, 47.64°, 54.25°, 55.30°, 56.76°, 57.60°, 62.02°, 63.58°, 64.11°, and 66.83° with the corresponding Miller indices (110), (020), (001), (200), (130), (210), (040), (140), (201), (230), (041), (310), (002), (311), (250), (112), (331), (251), (132), and (222), respectively; and, the monoclinic CuO phase (JCPDS Card No. 01-084-4310, the disclosure of which is incorporated herein by reference in its entirety) was identified at 2θ angles of 35.77°, 38.92°, 48.79°, 58.44°, 61.69°, 65.90°, 67.36°, 68.19°, 69.57°, 72.30°, 74.40°, and 75.24°, corresponding to the Miller indices (−111), (111), (−202), (202), (−113), (022), (113), (220), (−221), (311), (004), and (−222), respectively.

The average crystallite size for the nanocomposite synthesized at 650° C. was 70.26 nm. Table 1 herein below summarizes the properties of the nanocomposite synthesized at 650° C.

TABLE 1

Components of nanocomposite Synthesized at 650° C., as determined by XRD.

| Components of nanocomposite at 650° C. | | | | Average crystallite |
|---|---|---|---|---|
| Phase | Chemical name | Card No. | Crystal system | size (nm) |
| PbO | Lead oxide | JCPDS-01-072-0093 | Orthorhombic | 70.26 |
| $Ca_2PbO_4$ | Dicalcium lead (IV) oxide | JCPDS-00-024-0207 | Orthorhombic | |
| CuO | Copper oxide | JCPDS-01-084-4310 | Monoclinic | |

For the nanocomposite synthesized at 850° C.: the orthorhombic $Ca_2CuO_3$ phase (JCPDS-Card No. 01-084-1970, the disclosure of which is incorporated herein by reference in its entirety) was identified at 2θ angles of 14.57, 32.41, 35.35, 36.52, 44.49, 47.42, 48.68, 58.86, 61.27, 66.74, 67.67, and 78.18 with corresponding Miller indices (200), (310), (301), (011), (600), (411), (020), (202), (321), (312), (620), and (10 0 0), respectively; the orthorhombic PbO phase (JCPDS Card No. 01-072-0093, the disclosure of which is incorporated herein by reference in its entirety) appeared at 2θ angles of 15.21°, 29.17°, 30.53°, 37.45°, 37.98°, 45.22°, 46.38°, 49.32°, 50.89°, 53.19°, 60.65°, 63.27°, and 73.56° with corresponding Miller indices (100), (111), (200), (021), (002), (220), (300), (202), (022), (311), (222), (400), and (331), respectively; the orthorhombic $Ca_2PbO_4$ phase (JCPDS Card No. 01-076-2128, the disclosure of which is incorporated herein by reference in its entirety) was observed at 2θ angles of 31.99°, 34.19°, 35.88°, 54.97°, 56.14°, and 75.97°, corresponding to the Miller indices (111), (220), (121), (002), (241), and (440), respectively; and, the tetragonal PbO phase (JCPDS Card No. 01-085-9182, the disclosure of which is incorporated herein by reference in its entirety) was identified at 2θ angles of 17.84° and 42.49°, corresponding to the Miller indices (001) and (102), respectively.

The average crystallite size of the nanocomposite synthesized at 850° C. was 60.54 nm. Table 2 herein below summarizes the components of nanocomposites which were synthesized at 850° C.

TABLE 2

Components of nanocomposite synthesized at 850° C. as determined by XRD.

| Components of nanocomposite at 800° C. | | | | Average crystallite |
|---|---|---|---|---|
| Phase | Chemical name | Card No. | Crystal system | size (nm) |
| $Ca_2CuO_3$ | Dicalcium copper oxide | JCPDS-01-084-1970 | Orthorhombic | 60.54 |
| PbO | Lead oxide | JCPDS-01-072-0093 | Orthorhombic | |
| $Ca_2PbO_4$ | Dicalcium lead(IV) oxide | JCPDS-01-076-2128 | Orthorhombic | |
| PbO | Lead oxide | JCPDS-01-085-9182 | Tetragonal | |

In summary, the XRD patterns confirmed the presence of orthorhombic PbO and $Ca_2PbO_4$ phases, and a monoclinic CuO phase in the nanocomposite synthesized at 650° C., while the nanocomposite synthesized at 850° C. contained orthorhombic $Ca_2CuO_3$, PbO and $Ca_2PbO_4$ phases and a tetragonal PbO phase.

Figure 3A:
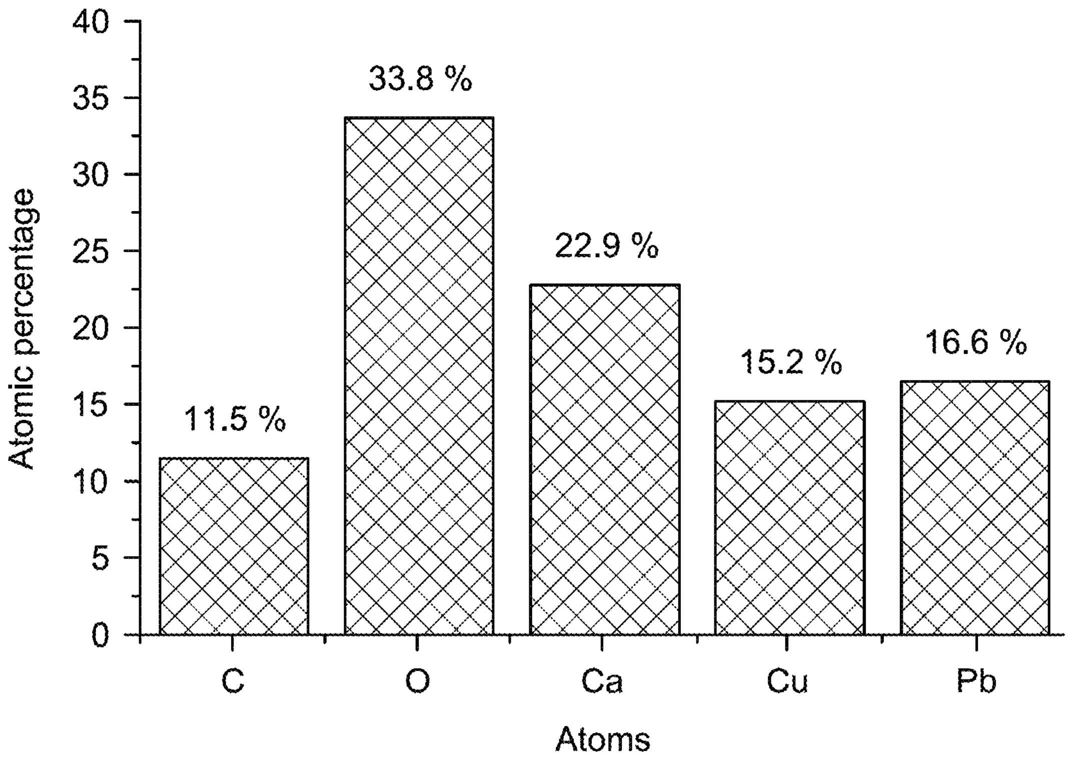
FIG. 3A shows an atomic percentage distribution of elements in the nanocomposite synthesized at 650° C., as determined by Energy-Dispersive X-ray spectroscopy (EDX) analysis, according to certain embodiments.
Figure 3B:
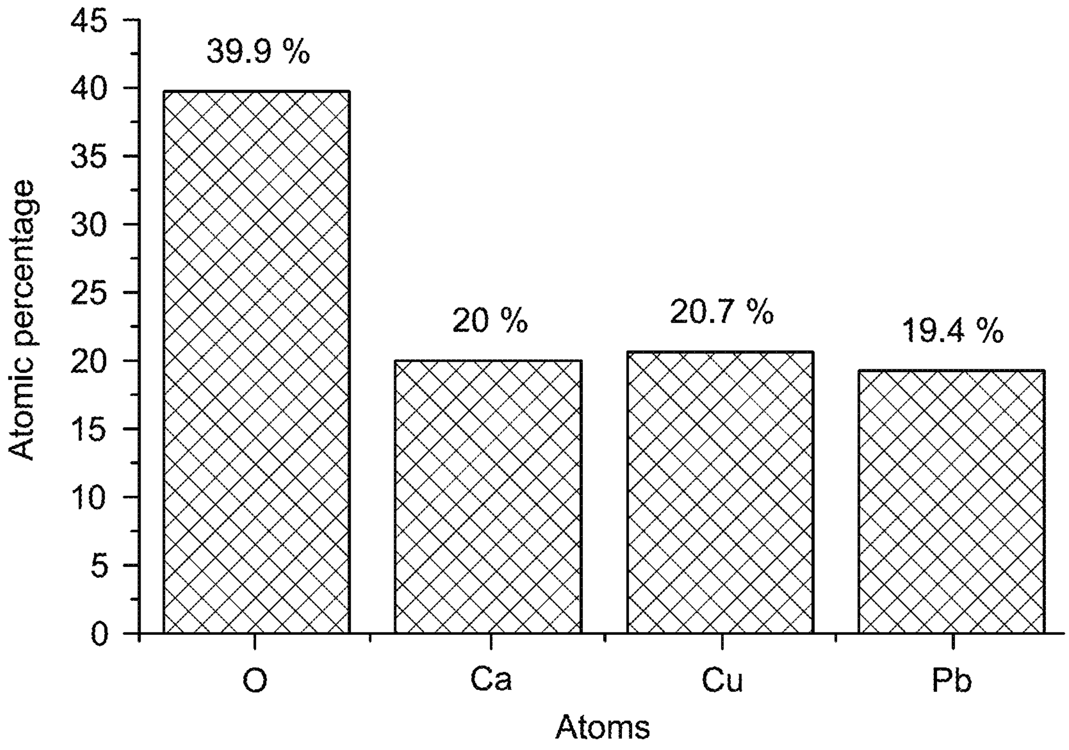
FIG. 3B shows the atomic percentage distribution of elements in the nanocomposite synthesized at 850° C., as determined by Energy-Dispersive X-ray spectroscopy (EDX) analysis, according to certain embodiments.

FIGS. 3A-3B shows the atomic percentage distribution of elements in the nanocomposites synthesized at 650° C. (FIG. 3A) and 850° C. (FIG. 3B), as determined by energy-dispersive X-ray spectroscopy (EDX) analysis. At 650° C., the atomic percentages of carbon (C), oxygen (O), calcium (Ca), copper (Cu), and lead (Pb) are 11.5%, 33.8%, 22.9%, 15.2%, and 16.6%, respectively. Upon increasing the calcination temperature to 850° C., significant changes in the atomic percentages are observed, with O increasing to 39.9%, Ca decreasing to 20%, Cu slightly increasing to 20.7%, lead decreasing to 19.4%, while C is completely absent in the sample. The obtained variations suggest that the elevated temperature promotes the removal of C residues and enhances the oxidation process, leading to a higher oxygen content in the nanocomposite. The decrease in Ca and Pb percentages at 850° C. was attributed to involvement of in the formation of more stable crystalline phases such as orthorhombic $Ca_2CuO_3$ and tetragonal PbO. Additionally, the slight increase in copper content indicates its increased stability and integration into the nanocomposite structure at higher calcination temperatures. The results confirm that temperature plays a critical role in the composition and phase purity of the synthesized nanocomposites.

Figure 4A:
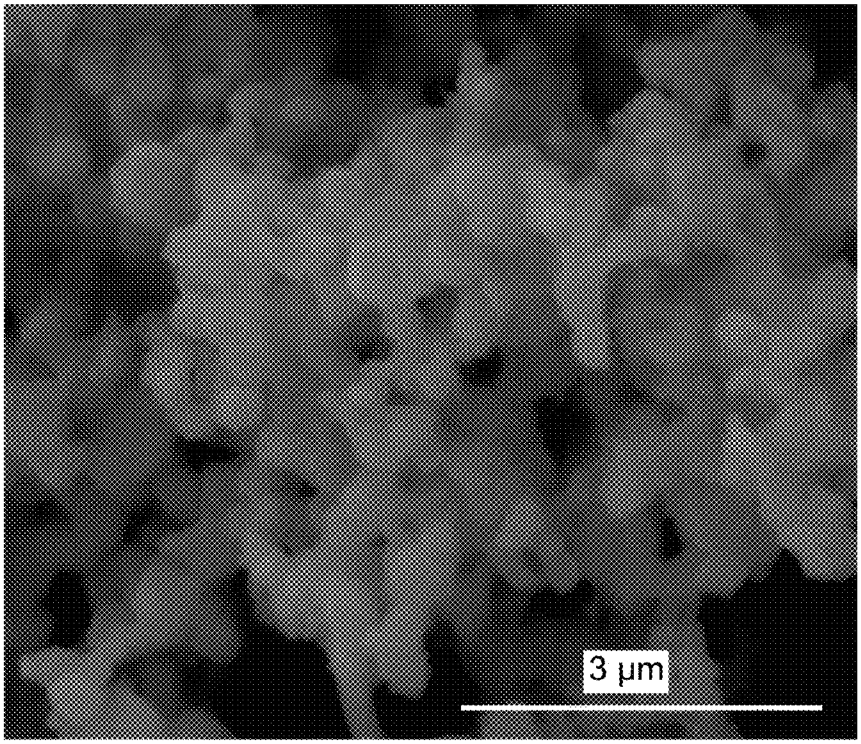
FIG. 4A shows a scanning electron microscope (SEM) image of a nanocomposite synthesized at 650° C. using the Pechini sol gel method, according to certain embodiments.
Figure 4B:
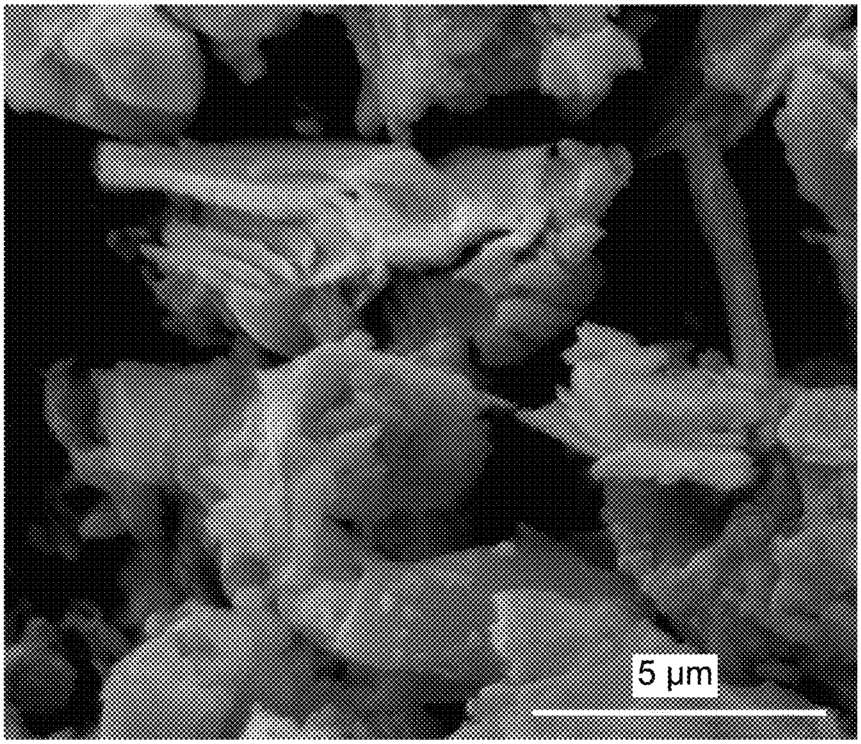
FIG. 4B shows a scanning electron microscope (SEM) image of a nanocomposite synthesized at 850° C. using Pechini sol gel method, according to certain embodiments.

FIGS. 4A-4B presents the scanning electron microscope (SEM) images of the nanocomposites synthesized at 650° C. (FIG. A) and 850° C. (FIG. B) using the Pechini sol-gel method. In FIG. 4A, the nanocomposite synthesized at 650° C. exhibits a highly agglomerated and spherical particle morphology with a smaller particle size distribution, which is typical of materials synthesized at lower calcination temperatures due to incomplete crystal growth and the presence of residual organic components. In contrast, FIG. 4B, depicting the morphology of the nanocomposite synthesized at 850° C., displayed larger and more defined plate-like and irregular-shaped particles. The obtained transformation in morphology were attributed to the higher temperature, which facilitates the removal of residual organics, enhances grain growth, and promotes the formation of more crystalline phases. The increased thermal energy at 850° C. allows the particles to undergo coalescence and rearrangement, leading to the formation of larger and more distinct structures. The obtained observations confirm that calcination temperature significantly influences the particle morphology and crystal structure of the synthesized nanocomposites.

The synthesized Pb—Ca—Cu-based nanocomposites have several potential commercial applications. The prepared nanocomposites have potential to be utilized as advanced catalysts in chemical industries due to crystalline phases and nanoscale properties of prepared nanocomposites. Additionally, the prepared nanocomposites have potential to be serve as efficient adsorbents for removing heavy metals from wastewater, addressing environmental pollution. The prepared nanocomposites hold promise in electronic and optical devices, leveraging their distinctive structural and morphological characteristics.

Numerous modifications and variations of the present disclosure are possible in light of the above teachings. It is therefore to be understood that within the scope of the appended claims, the invention may be practiced otherwise than as specifically described herein.

The invention claimed is:

1. A particulate nanocomposite material, comprising:
an orthorhombic PbO crystalline phase,
an orthorhombic $Ca_2PbO_4$ crystalline phase,
a monoclinic CuO crystalline phase, and
carbon;
wherein, based on the total number of atoms in the particulate nanocomposite material:
the atomic concentration of carbon (C) is from 8 atom % to 12 atom %,
the atomic concentration of lead (Pb) is from 14 atom % to 17 atom %,
the atomic concentration of calcium (Ca) is from 17 atom % to 23 atom %, and
the atomic concentration of copper (Cu) is from 14 atom % to 17 atom %;
wherein the particulate nanocomposite material comprises substantially spherical particles and agglomerates thereof, wherein at least 60% of the spherical particles have a particle size of less than about 400 nm; and
wherein the particulate nanocomposite material has a volume average crystallite size of from 69 nm to about 71 nm.

2. The particulate nanocomposite material as defined in claim 1, wherein, based on the total number of atoms in the particulate nanocomposite material:
the atomic concentration of carbon (C) is 11.5 atom %,
the atomic concentration of lead (Pb) is from 16.6 atom %,
the atomic concentration of calcium (Ca) is 22.9 atom %, and
the atomic concentration of copper (Cu) is 15.2 atom %.

* * * * *